Jan. 5, 1960 H. J. RECK ET AL 2,919,787
FEEDING AND ARRANGING MECHANISM FOR EGGS
Filed Feb. 11, 1954 9 Sheets-Sheet 8
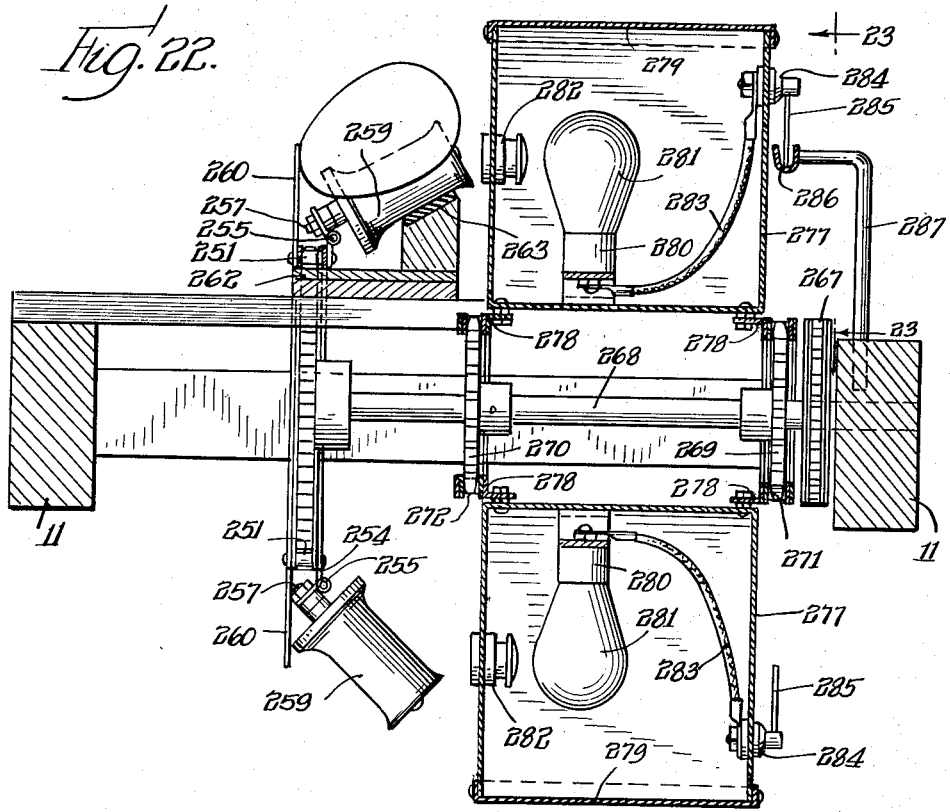
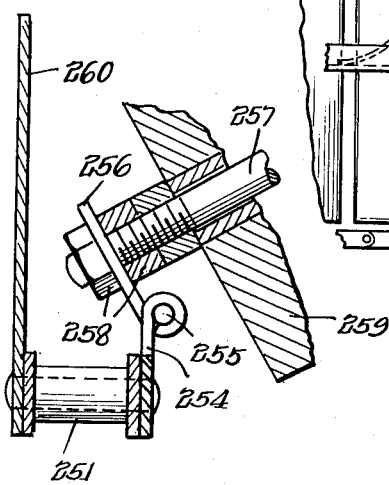
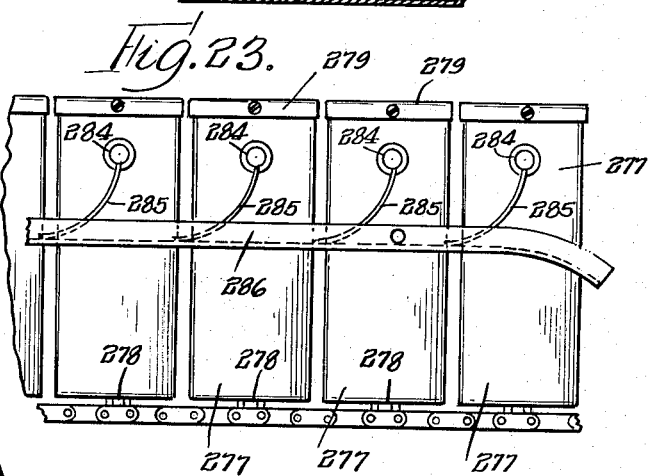
INVENTORS.
Herbert J. Reck
Hilbert W. Reck
By: Wallenstein & Spangenberg
Attys Jan. 5, 1960     H. J. RECK ET AL     2,919,787
FEEDING AND ARRANGING MECHANISM FOR EGGS
Filed Feb. 11, 1954                                                9 Sheets-Sheet 9
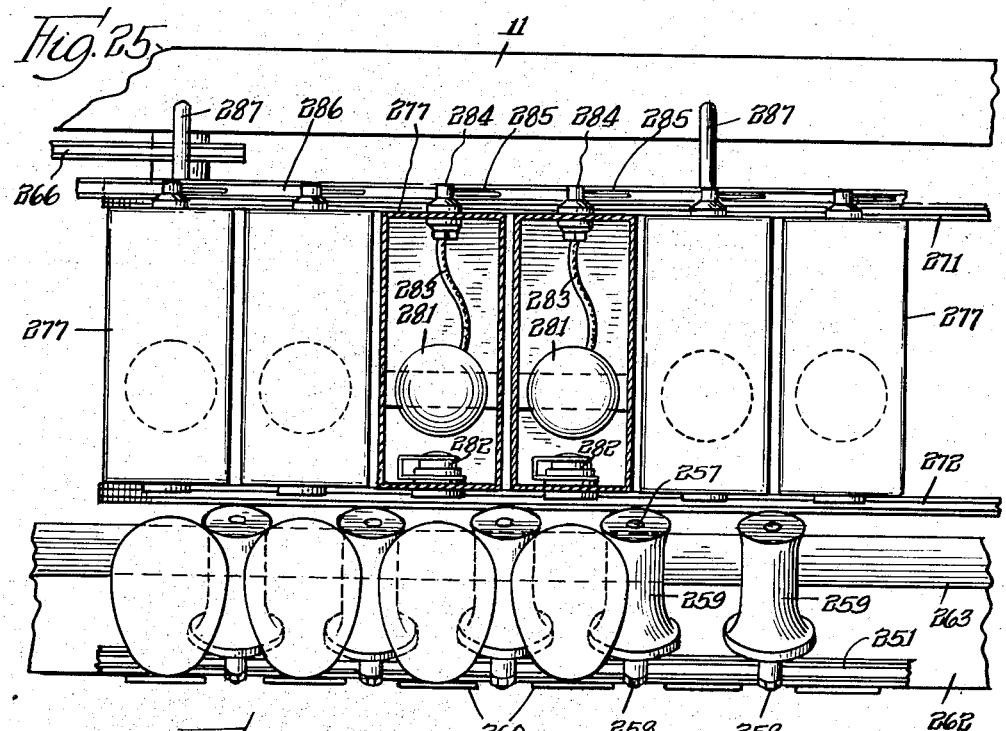
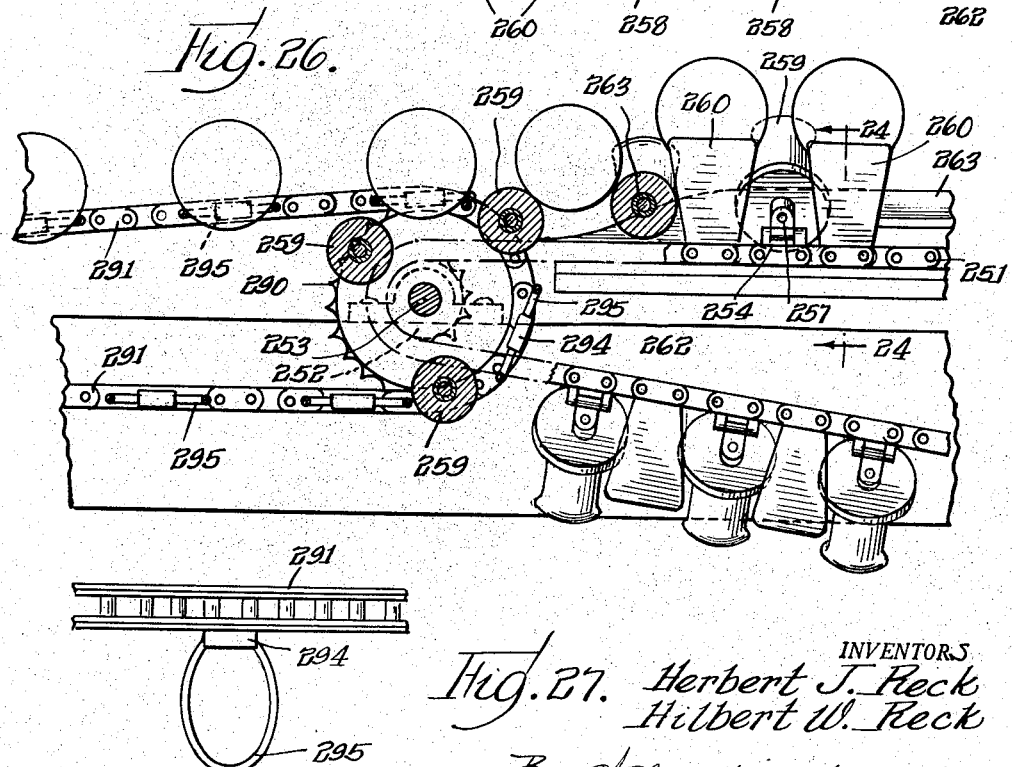
INVENTORS
Herbert J. Reck
Hilbert W. Reck United States Patent Office 2,919,787
Patented Jan. 5, 1960

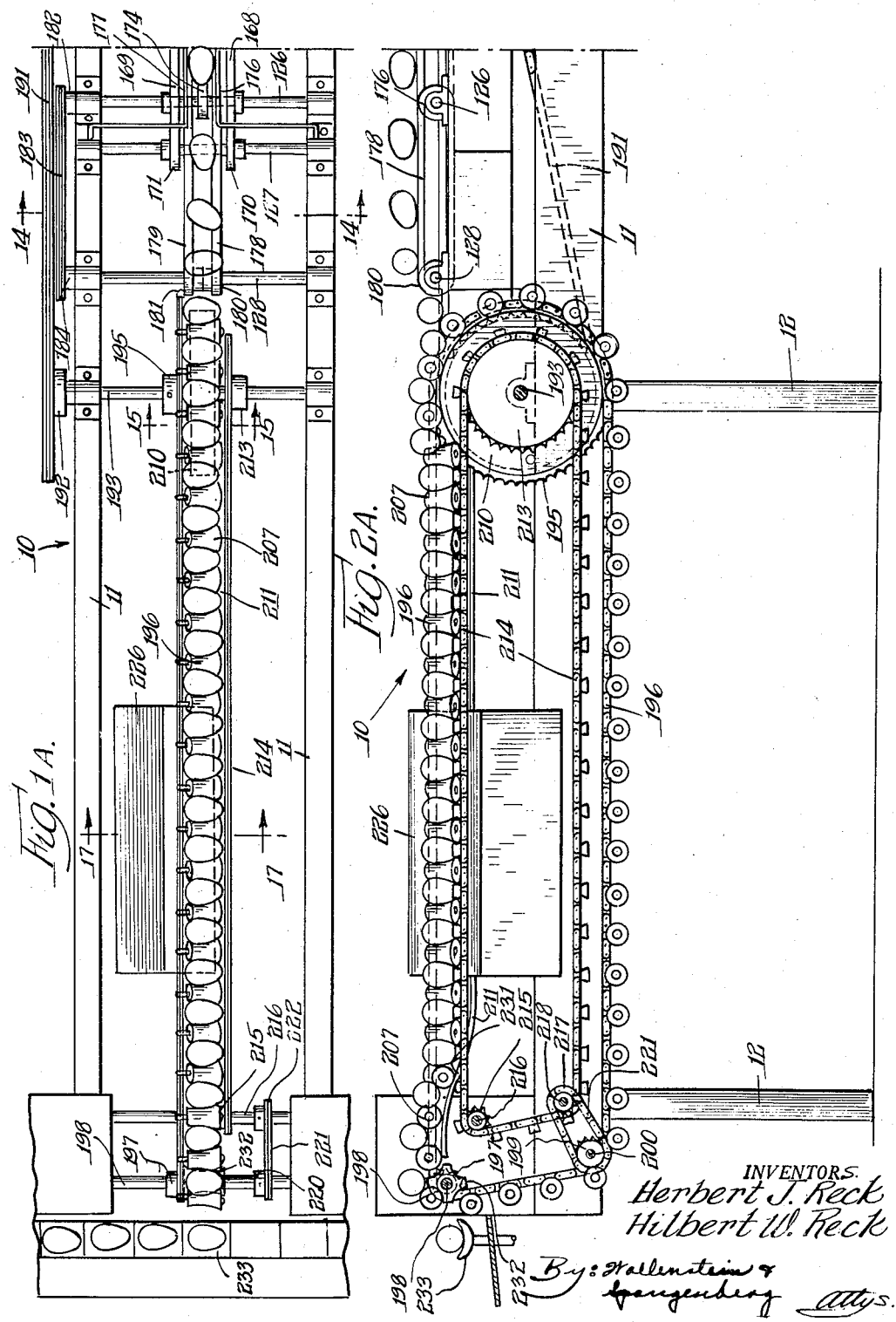

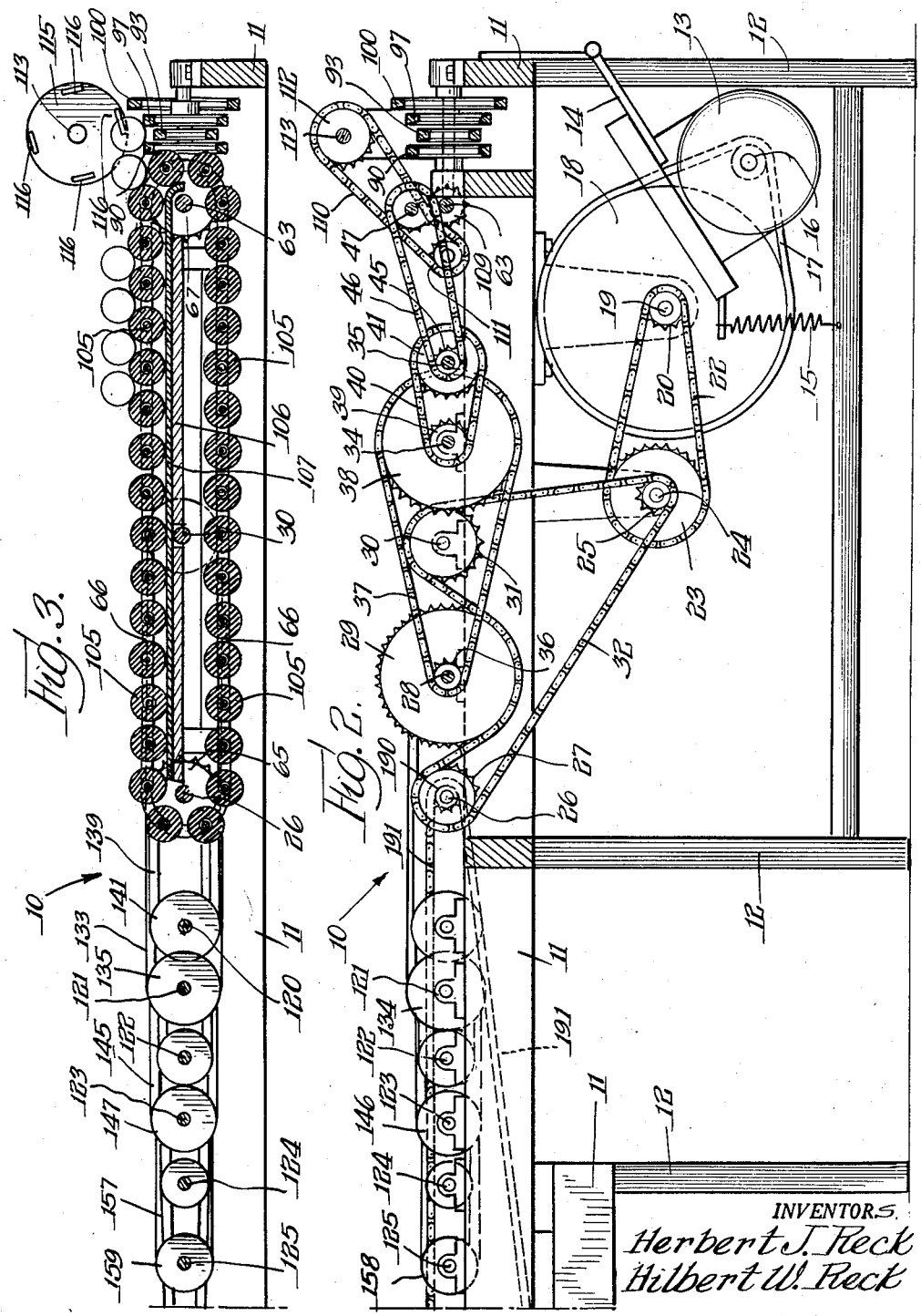

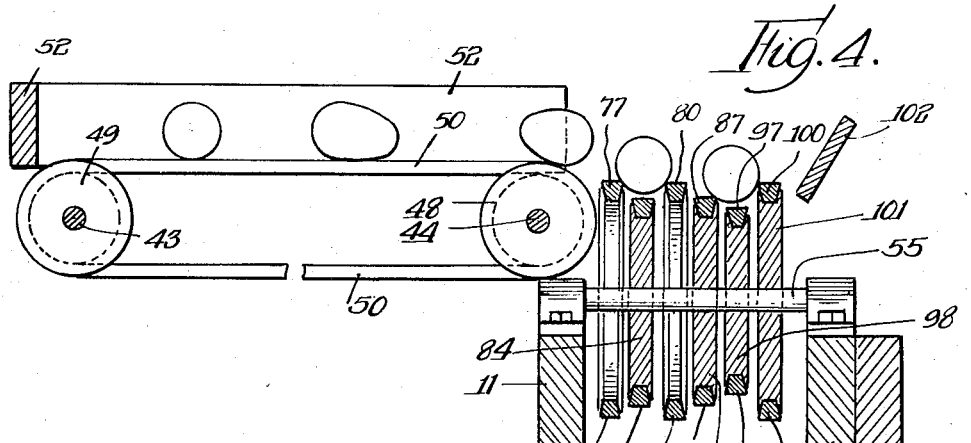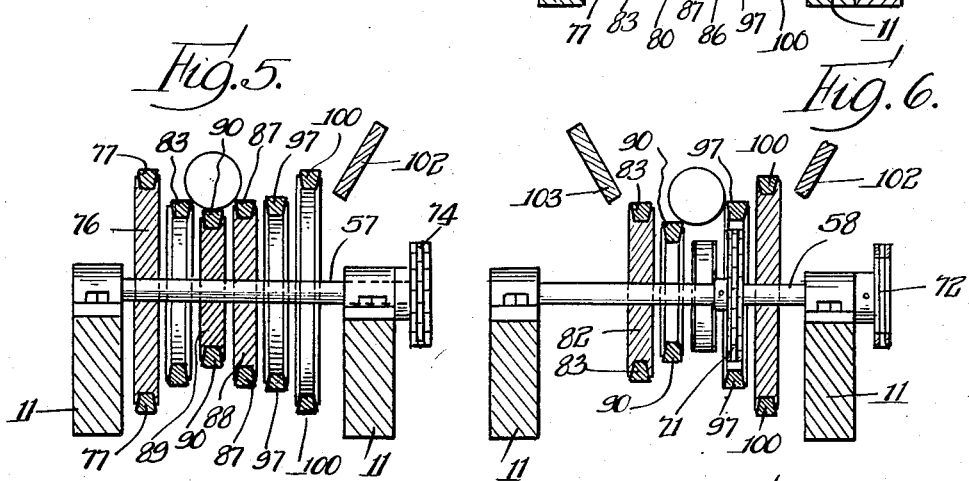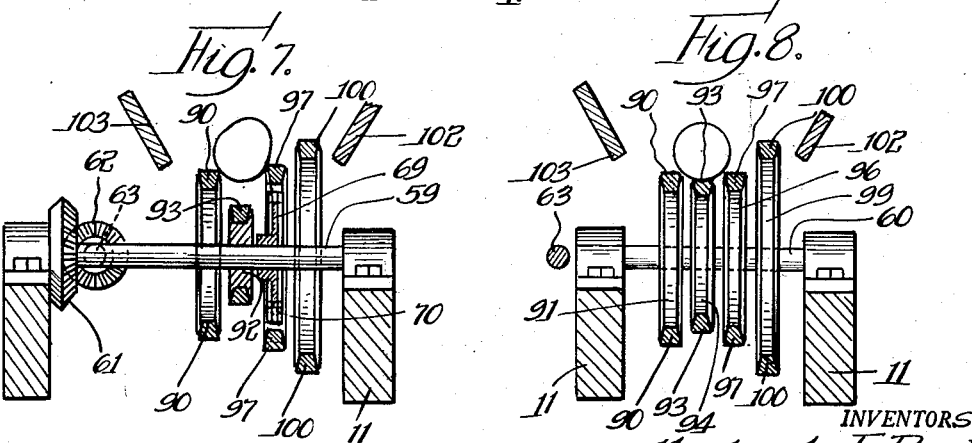

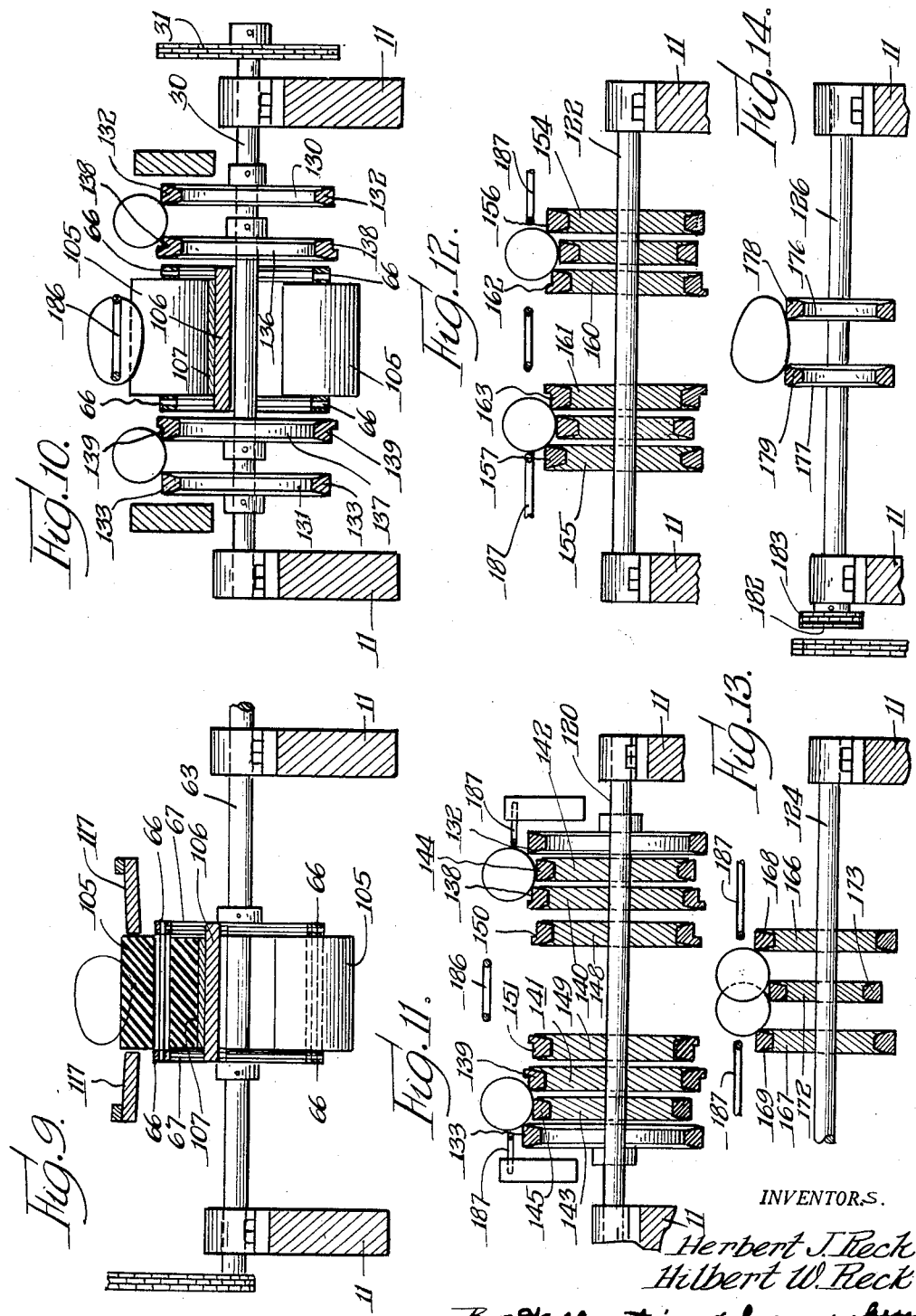

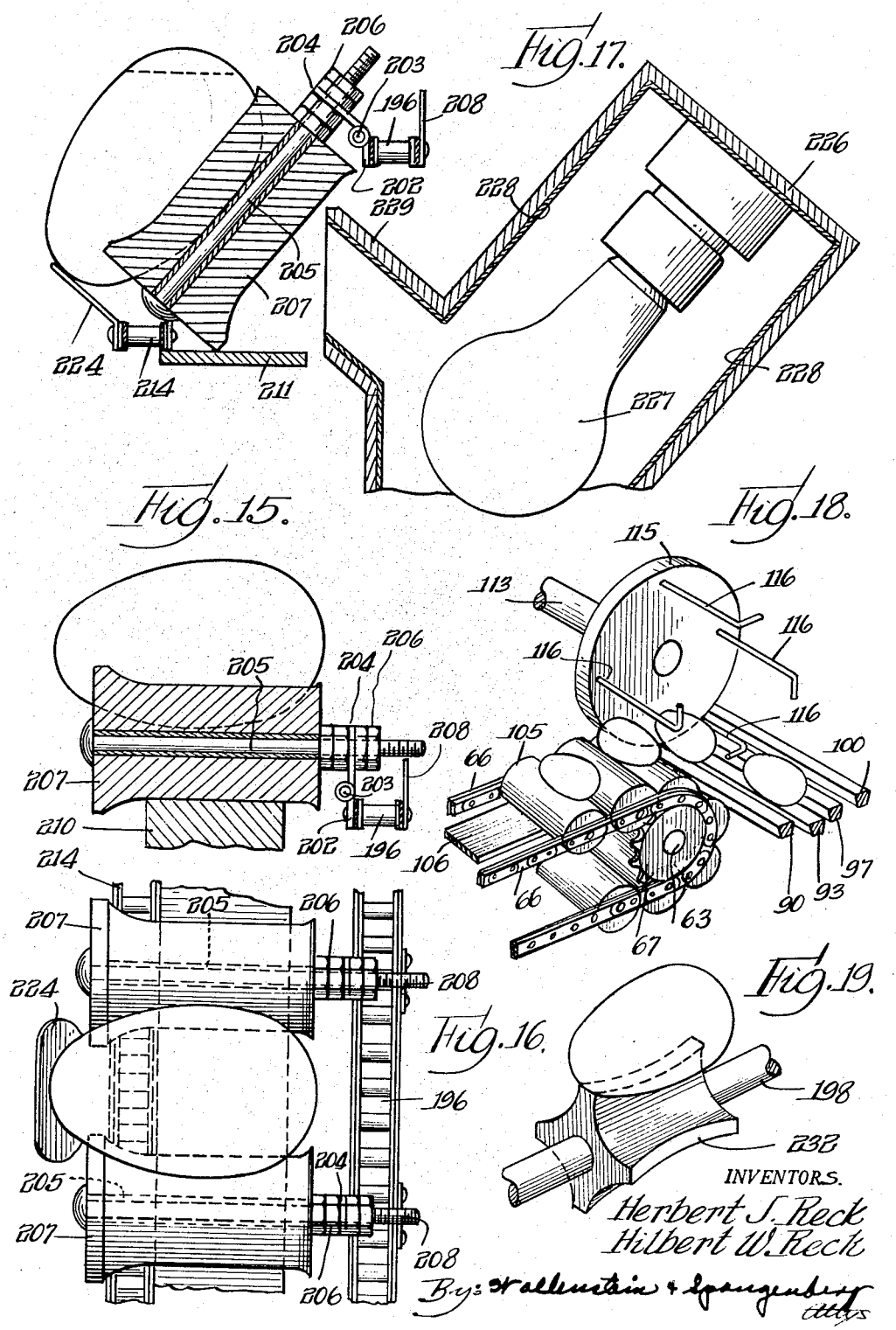

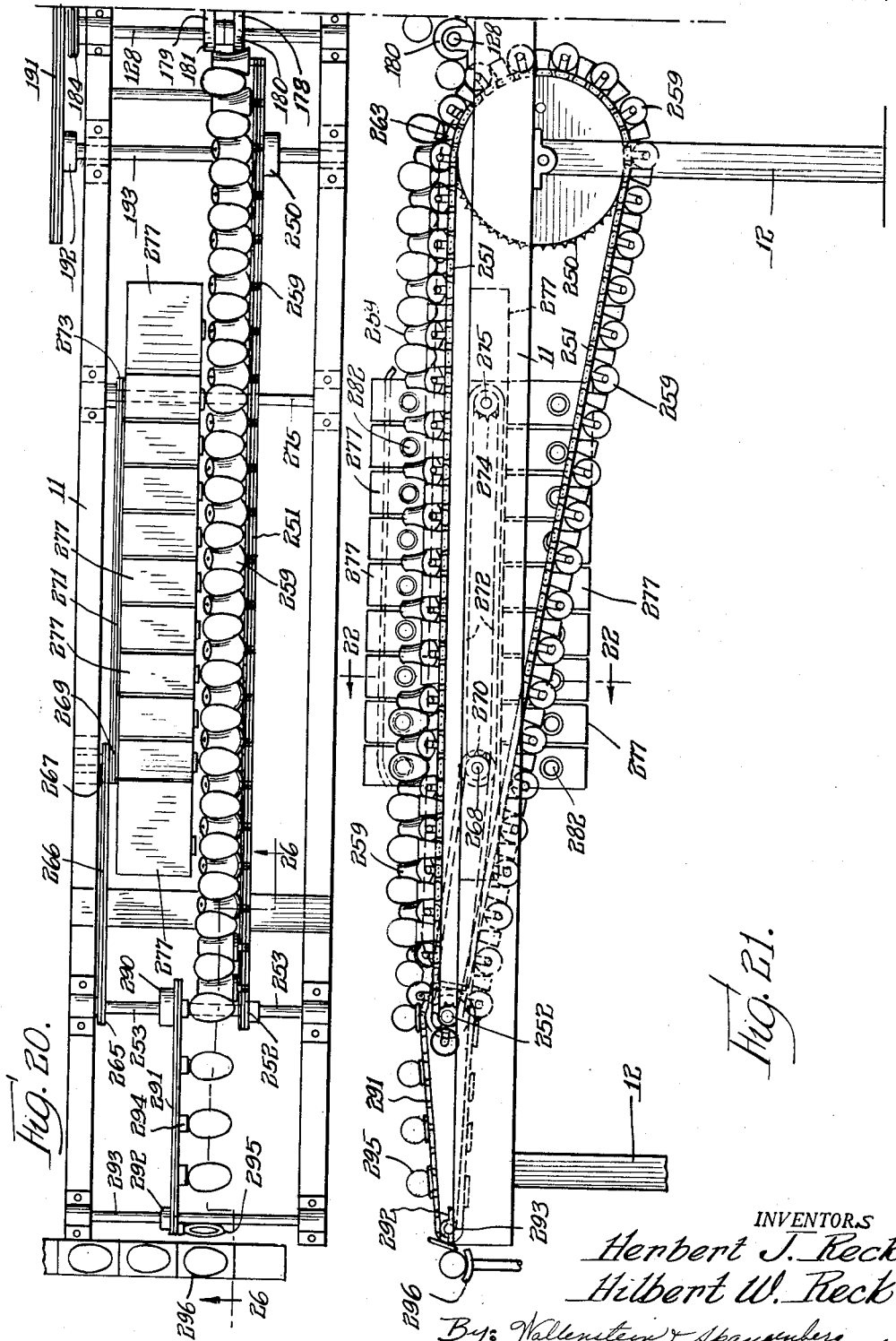

2,919,787

FEEDING AND ARRANGING MECHANISM FOR EGGS

Herbert J. Reck and Hilbert W. Reck, Elgin, Ill.

Application February 11, 1954, Serial No. 409,668

21 Claims. (Cl. 198—30)

This invention relates to a mechanism for feeding and arranging eggs or other similarly shaped articles, such a mechanism being particularly adaptable for randomly receiving the eggs in the bulk and then feeding and arranging such eggs in desired position one at a time to an egg candling device, a grader, a breaker or the like.

In the past it has been usual manually to handle the eggs in arranging the eggs for purposes of candling, grading, breaking or the like. For example, in candling eggs, the candling expert would handle the eggs directly from the bulk, which is a slow and tedious procedure, or else the eggs would be supplied to him in regular fashion by a number of assistants. In either event, labor costs in handling and candling the eggs have been very high.

The principal object of this invention is to provide an improved feeding and arranging mechanism wherein the eggs or other similarly shaped articles are automatically taken from the bulk, arranged in a single file with the long axes of the eggs arranged in parallel and with the small ends of the eggs facing in the same direction, and conveyed in this fashion to suitable devices for candling, grading, breaking or the like, wherein the eggs during candling are spun and arranged with their large or air cell ends facing upwardly, wherein large numbers of eggs may be so handled in an efficient and speedy manner, wherein labor costs in handling the eggs are greatly reduced, wherein manual candling of large numbers of eggs may be rapidly accomplished by a candling expert and a single assistant, the assistant merely feeding eggs in bulk to the egg feeding mechanism, wherein costs of manufacture, installation and maintenance are kept at a minimum, and wherein the construction and operation thereof is simple and foolproof.

Briefly, the egg feeding and arranging mechanism of this invention includes a moving platform upon which large quantities of eggs from the bulk are randomly placed. A conveyor receives the eggs from the downstream end of the moving platform and conveys the received eggs in single file to one end of an egg spinning and advancing device. This device includes a plurality of rollers arranged adjacent each other with their axes parallel and means for advancing the rollers along a path and rotating the same. The eggs are fed, one at a time, onto the rollers at the beginning of the path, they are advanced by the rollers and spun thereby about their long axes substantially parallel to the axes of the rollers but tilted slightly therefrom, and they are discharged small end first off of the axes of the rollers toward which the small end of the eggs are pointing.

Conveyor means are located on each side of the advancing path of the rollers and movable parallel thereto and in the same direction for receiving and conveying the eggs discharged from the ends of the rollers, said conveyor means receiving and conveying the eggs with their small ends pointing forwardly. A single conveyor is located beyond the advancing path of the rollers and between the pair of conveyor means. Means are provided for transferring the eggs from the conveyor means onto the single conveyor in single file and with their small ends pointing forwardly to be conveyed thereby.

A plurality of spools are arranged adjacent each other with their axes parallel, and means are provided for advancing the spools along a path and rotating the same. Means are also provided for transferring the eggs from the single conveyor onto the advancing and rotating spools and these transferring means include means for turning the eggs to cause their long axes to be parallel to the axes of the spools and their small ends extending in the same direction. The eggs are advanced and spun about their long axes by the spools. A candling lamp may be arranged adjacent to the advancing path of the spools and means are provided for tilting the spools as they pass the candling lamp to cause the advancing and spinning eggs to be tilted to a position with their large or air cell ends facing upwardly as they pass the candling lamp. A grader may be located at the end of the advancing path of the spools and means are provided for transferring the eggs from the advancing and rotating spools onto the egg grader for grading the same.

Further objects of this invention reside in the details of construction of the feeding and arranging mechanism for eggs and similarly shaped articles and in the cooperative relationships between the component parts thereof.

Other objects and advantages will become apparent to those skilled in the art upon reference to the accompanying specification, claims and drawings in which:

Fig. 1A is a top plan view of another portion of the feeding and arranging mechanism, Fig. 1A being an extension of Fig. 1;

Fig. 2 is a vertical view partly in section of the feeding and arranging mechanism taken substantially along the line 2—2 of Fig. 1;

Fig. 2A is a vertical sectional view through the feeding and arranging mechanism and forms an extension of Fig. 2;

Fig. 3 is a vertical sectional view taken substantially along the line 3—3 of Fig. 1;

Fig. 4 is a vertical sectional view taken substantially along the line 4—4 of Fig. 1;

Figure 1:
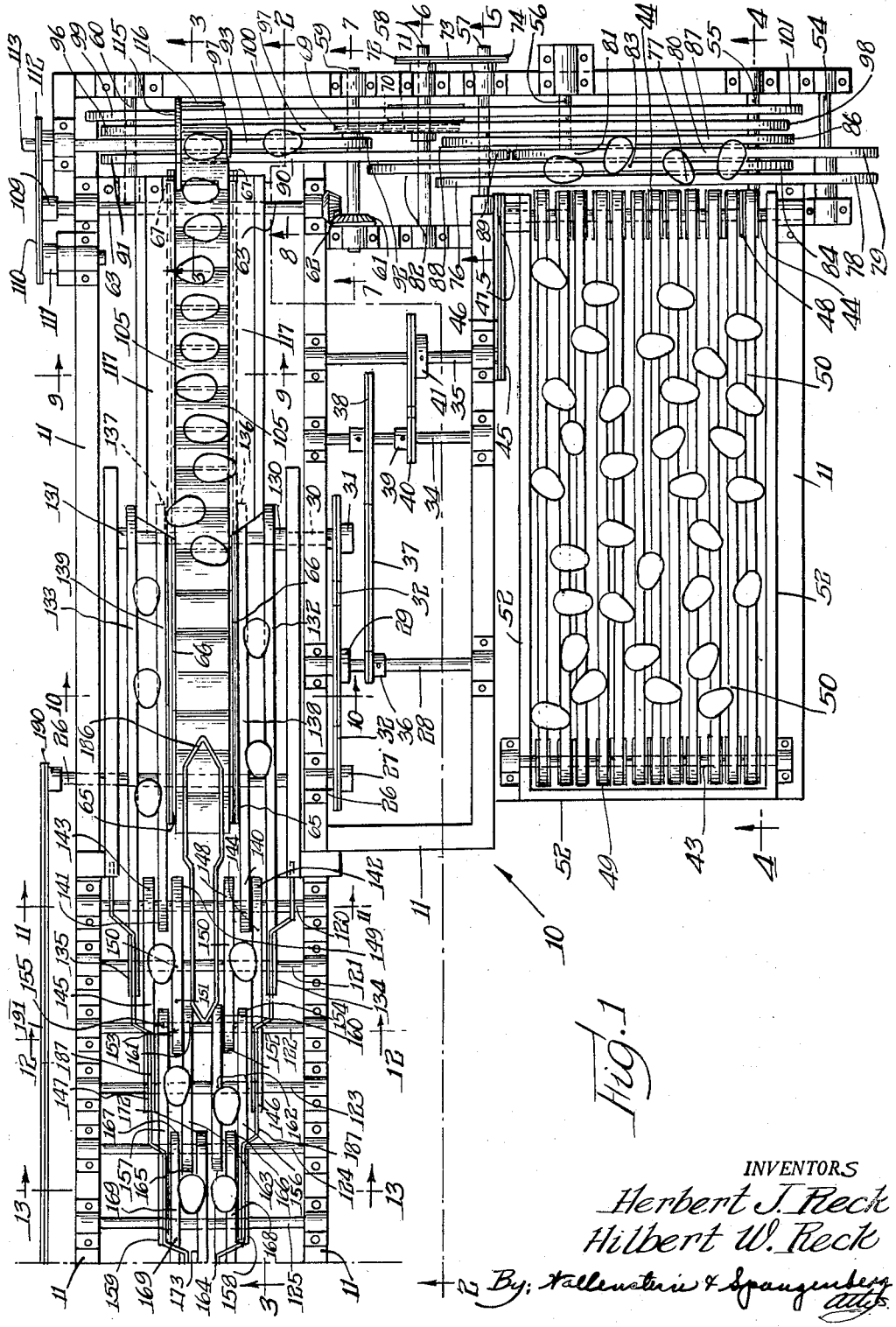
Fig. 1 is a top plan view of a portion of the feeding and arranging mechanism for eggs.

Figs. 5, 6, 7 and 8 are vertical sectional views taken substantially along the lines 5—5, 6—6, 7—7 and 8—8 of Fig. 1;

Figs. 9, 10, 11, 12 and 13 are vertical sectional views taken substantially along the lines 9—9, 10—10, 11—11, 12—12 and 13—13 of Fig. 1;

Fig. 14 is a vertical sectional view taken substantially along the line 14—14 of Fig. 1A;

Fig. 15 is a partial vertical sectional view taken substantially along the line 15—15 of Fig. 2A;

Fig. 16 is a plan view of a portion of the mechanism illustrated in Fig. 1A;

Fig. 17 is a vertical sectional view taken substantially along the line 17—17 of Fig. 1A;

Fig. 18 is a partial perspective view of the portion of the mechanism illustrated in the upper righthand corner of Fig. 1;

Fig. 19 is a perspective view of a portion of the mechanism illustrated at the left end of Figs. 1A and 2A;

Fig. 20 is a top plan view of another form of the feeding and arranging mechanism, corresponding to Fig. 1A and being an extension of Fig. 1;

Fig 21 is a vertical sectional view through said other form of the feeding and arranging mechanism, corresponding to Fig. 2A and being an extension of Fig. 2;

Fig. 22 is a vertical sectional view taken substantially along the line 22—22 of Fig. 21;

Fig. 23 is a partial elevational view shown partly in section and taken substantially along the line 23—23 of Fig. 22;

Fig. 24 is a partial enlarged vertical sectional view of the manner of mounting the spools utilized in Figs. 20 and 21;

Fig. 25 is a top plan view partly in section of a portion of the mechanism illustrated in Figs. 20 and 22;

Fig. 26 is a vertical sectional view taken substantially along the line 26—26 of Fig. 20;

Fig. 27 is an enlarged plan view of a portion of the mechanism illustrated in Fig. 26.

The preferred form of the feeding and arranging mechanism for eggs of this invention is generally designated at 10. It includes a frame 11 supported by legs 12 for carrying the various operating parts of the mechanism. As shown in Fig. 2 an electric motor 13 is carried by a pivoted bracket 14 in turn carried by the frame and a spring 15 urges the motor 13 downwardly. The motor 13 drives a pulley 16 which is connected by a belt 17 to a pulley 18 fixed to a shaft 19 suitably journaled on the frame. The weight of the motor and the spring 15 operate to maintain the belt 17 tight on the pulleys 16 and 18. Thus as the motor 13 is operated the shaft 19 is rotated. The shaft 19 carries a sprocket wheel 20 which in turn is connected by a chain 22 to a sprocket wheel 23 mounted on a shaft 24 which is also journaled for rotation by the frame 11. The shaft 24 carries another sprocket wheel 25.

A shaft 26 journaled on the frame 11 carries a sprocket wheel 27. Likewise shafts 28 and 30 are journaled on the frame and they carry sprocket wheels 29 and 31, respectively. A chain 32 is carried by the sprocket wheels 25, 27, 29 and 31 for rotating the shafts 26, 28 and 30 as the shaft 24 is rotated by the motor. The drive for the various parts of the mechanism of this invention is taken from the shafts 26, 28 and 30.

The frame also carries a pair of shafts 34 and 35. A sprocket wheel 36 on the shaft 28 is connected by a chain 37 to a sprocket wheel 38 secured to the shaft 34. The shaft 34 also carries a sprocket wheel 39 which is connected by a chain 40 to a sprocket wheel 41 secured to the shaft 35. The frame also carries a pair of shafts 43 and 44. A sprocket wheel 45 on the shaft 35 is connected by a chain 46 to a sprocket wheel 47 on the shaft 44. In this way, the shaft 44 is rotated. A plurality of pulleys 48 are secured to the shaft 44 and a plurality of pulleys 49 are carried by the shaft 43. A plurality of belts 50 are carried on the pulleys 48 and 49 and form a moving platform for the random reception of eggs. Three sides of the belts 50 are provided with retaining walls 52. As eggs are placed on the moving platform formed by the belts 50 they are advanced to the right as illustrated in Fig. 1 and they are maintained on the platform by the rails 52.

The right hand end of the frame as illustrated in Fig. 1 is provided with a plurality of shafts 54, 55, 56, 57, 58, 59 and 60, these shafts being located in parallel relationship and being suitably journaled on the frame. The shaft 59 has a beveled gear 61 secured thereto which meshes with a beveled gear 62 carried by a shaft 63 mounted for rotation on the frame. The shaft 26 carries a pair of sprocket wheels 65 which are connected by a pair of chains 66 to a pair of sprocket wheels 67 secured to the shaft 63. Thus as the shaft 26 is rotated the chains 66 cause rotation of the shaft 63 which in turn causes rotation of the shaft 59 through the beveled gears 61 and 62. The shaft 59 carries a sprocket wheel 69 which is connected by a chain 70 to a sprocket wheel 71 secured to the shaft 58. The shaft 58 also carries a sprocket wheel 72 which is connected by a chain 73 to a sprocket wheel 74 secured to the shaft 57. Thus the shafts 58 and 57 are positively rotated along with the shaft 59.

The shaft 57 has a pulley 76 secured thereto and a belt 77 extends from the pulley 76 to a pulley 78 secured to the shaft 54. A second pulley 79 is secured to the shaft 54 and a belt 80 extends from this pulley to a pulley 81 which is secured to the shaft 56. Thus the belts 78 and 79 are moved upwardly as illustrated in Fig. 1. A pulley 82 is secured to shaft 58 and a belt 83 extends from that pulley to a pulley 84 which is secured to shaft 55. In this way, rotation of the shaft 58 causes upward movement of the belt 83 as illustrated in Fig. 1.

A pulley 86 is secured to the shaft 55 and a belt 87 extends from that pulley to a pulley 88 which is freely mounted for rotation on the shaft 57. A pulley 89 which is freely mounted on the shaft 57 has a belt 90 extending therefrom to a pulley 91 which is secured to the shaft 60. A pulley 92 secured to the shaft 59 has a belt 93 extending therefrom to a pulley 94 secured to the shaft 60. A pulley 96 secured to the shaft 60 has a belt 97 extending to a pulley 98 which is freely mounted on the shaft 55. Likewise a pulley 99 secured to the shaft 60 has a belt 100 extending therefrom to a pulley 101 freely mounted on the shaft 55. The various belts 77, 80, 83, 87, 90, 93, 97, 100 supported by their respective pulleys on the shafts 54, 55, 56, 57, 58, 59 and 60 form a conveyor for the eggs which are discharged off of the end of the moving platform formed by the belts 50. These belts forming this conveyor convey the eggs upwardly as illustrated in Fig. 1 and arrange the same in single file. To assist the belts in this function, guides 102 and 103 are located adjacent the belts.

A plurality of rollers 105 are rotatably carried by the chains 66 and the upper rollers ride along a supporting track 106 which may be provided with a rubber surface 107. Thus as the chains 66 are moved the rollers 105 are advanced and rotated. The outer end of the shaft 63 carries a sprocket wheel 109. A chain 110 carried by sprocket wheels 111 and 112 engages the sprocket wheel 109 to be driven thereby. The sprocket wheel 112 is carried by a shaft 113 suitably journaled on the frame. The shaft 113 carries a disk 115 which is provided with a plurality of fingers 116. The fingers 116 are in alignment with the rollers 105 and operate to transfer eggs one at a time from the belts 90, 93 and 97 of the conveyor onto the advancing and rotating rollers 105. Along a portion of the advancing path of the rollers 105 are guard rails 117. As the eggs are advanced by the advancing and rotating rollers 105, they are spun thereby about their long axes which are substantially parallel to the axes of the rollers but tilted slightly therefrom and as a result the eggs move along and are discharged small end first off the ends of the rollers toward which the small ends of the eggs are pointing. In this respect the long axes of the eggs are tilted slightly forwardly and downwardly with respect to the axes of the rollers. Suitable conveyor means are located on each side of the advancing path of the rollers for receiving the eggs discharged from the rollers.

The frame 11 beyond the path of advance of the rollers 105 is provided with a plurality of parallel shafts 120, 121, 122, 123, 124, 125, 126, 127 and 128. These various shafts carry pulleys which in turn carry belts for forming the conveying means. A pair of pulleys 130 and 131 are secured to the shaft 30 and the pulleys are connected respectively by belts 132 and 133 to pulleys 134 and 135 secured to the shaft 121. Likewise, a pair of pulleys 136 and 137 are secured to the shaft 30 and are provided with belts 138 and 139 extending to pulleys 140 and 141 secured to the shaft 120. The belts 132, 133, 138 and 139 are driven forwardly at the same linear speed as the speed of linear advance of the rollers 105. As the eggs are discharged small end first off of the ends of the rollers 105, they fall upon the advancing belts 132, 133, 138 and 139 with their small ends pointing forwardly, this being due primarily to the slight tilting of the long axes of the eggs as they are discharged from the rollers. As shown in Fig. 10, the inner sides of the belts 138 and 139 are provided with protruding flanges which further assist in turning the eggs small end forwardly on the belts when they are received thereon from the rollers.

The shaft 120 also has secured thereto a pair of pulleys 142 and 143 from which belts 144 and 145 extend to pulleys 146 and 147 secured to the shaft 123. Another pair of pulleys 148 and 149 are secured to the shaft 120 and a pair of belts 150 and 151 extend from these pulleys to pulleys 152 and 153 secured to shaft 122. A pair of pulleys 154 and 155 are secured to a shaft 122 and a pair of belts 156 and 157 extend from these pulleys to a pair of pulleys 158 and 159 secured to shaft 125. A pair of pulleys 160 and 161 secured to shaft 122 carry belts 162 and 163 which extend to pulleys 164 and 165 secured to shaft 124. The shaft 124 carries a pair of pulleys 166 and 167 from which extend belts 168 and 169 to pulleys 170 and 171 secured to shaft 127. A pulley 172 is secured to shaft 124 and carries a belt 173 which extends to a pulley 174 secured to shaft 126. A pulley 176 is secured on the shaft 126 and a pulley 177 is freely mounted on the shaft 126. These pulleys 176 and 177 carry belts 178 and 179 respectively, the belt 178 extending over a pulley 180 which is free on the shaft 128 and the belt 179 extending over a pulley 181 which is secured to the shaft 128. The shaft 126 carries a sprocket wheel 182 which is connected by a chain 183 to a sprocket wheel 184 secured to the shaft 128. The sprocket wheel 182 has a greater diameter than the sprocket wheel 184 so that the shaft 128 is driven more rapidly than the shaft 126. Since the pulley 181 is secured to the shaft 128 and the pulley 176 is secured to the shaft 126, the other pulleys 180 and 177 being freely mounted, the belt 179 will be driven faster than the belt 178.

As pointed out above, the advancing belts 132, 133, 138 and 139 receive the eggs from the advancing and rotating rollers 105 and operate to convey the eggs forwardly with their small ends all pointing forwardly. The various intermediate belts 144, 145, 150, 151, 156, 157, 162, 163 and 168, 169 operate to transfer the eggs from the belts 132, 133, 138 and 139 onto the belts 178 and 179 in single file with the small ends of the eggs pointing forwardly. To assist in guiding the eggs along these intermediate belts, there are provided guide members in the form of wires or the like, an inner guide member 186 and an outer guide member 187. In this way, the two rows of eggs collected on the conveyor means on opposite sides of the path of advance of the rollers 105, are converged into single file in a forwardly pointing manner and transferred to the belts 178 and 179. The belts 178 and 179 convey the eggs forwardly and at the same time turn them around so that their axes are side by side and parallel and their small ends are all pointing in the same direction.

The sprocket wheel 190 is secured to the outer end of the shaft 26 and a chain 191 extends from this sprocket wheel to a sprocket wheel 192 secured to a shaft 193. A sprocket wheel 195 is secured to the shaft 193 and it carries a chain 196. The chain 196 extends over the sprocket wheel 197 carried by a shaft 198 and a sprocket wheel 199 carried by a shaft 200. The chain 196 carries a plurality of brackets 202 provided with a pivot 203 and a pivoted member 204. A pin is secured to each bracket 204 and is held in place by nuts or the like 206. The pins 205 rotatably carry spools 207. The chain 196 is also provided with a plurality of ears 208 for receiving the ends of the pins 205 to prevent the spools from falling out of a horizontal position on the lower paths of the chain. Adjacent the sprocket wheel 195 is a stationary roll 210, the purpose of the roll being to hold the spools 207 horizontal when they are adjacent to the sprocket wheel 195. When the spools 207 are in the horizontal positions adjacent the sprocket wheel 195, eggs are deposited thereon by the belts 178 and 179, the small ends of the eggs all being directed in the same direction. As the spools 207 with the eggs are advanced they are rotated or spun by the stationary roll 210 and by a stationary track 211, the spools riding on these members and being rotated as they are advanced. The track 211 is located lower than the stationary roll 210 so that the spools 207 are tilted to tilt the eggs to a position where their large air cell ends are directed upwardly.

A sprocket wheel 213 is freely mounted on the shaft 193 and it carries a chain 214 which extends over a sprocket wheel 215 carried by a shaft 216 and a sprocket wheel 217 carried by a shaft 218. The sprocket wheel 213 is smaller in diameter than the sprocket wheel 195. The chain 214 is located in parallel relationship with the chain 196. The shaft 200 has a sprocket wheel 220 secured thereto which is connected by a chain 221 to a sprocket wheel 222 secured to the shaft 218. This chain 221 and its sprocket wheels operate to drive the shaft 218 and hence drive the chain 214. The arrangement is such that the chain 214 is driven at the same linear speed as the chain 196. The chain 214 carries a plurality of members 224 which are engaged by the small ends of the eggs to prevent the eggs from sliding from the spools 207 when they are tilted small end downwardly as illustrated in Fig. 17.

Adjacent the path of advance of the spools 207 is a candling mechanism 226 having a light source 227 therein, and internal mirrors 228 for shining light through an opening 229 onto the eggs being advanced thereby. As the eggs are advanced past the candling mechanism they are tilted large end upwardly and are also spun or rotated by the rollers 207. In this way proper candling, inspection of the air cells in the large ends, of the eggs is readily accomplished.

The track 211 is gradually elevated adjacent the shaft 198 as illustrated at 231 for the purpose of arranging the spools 207 horizontally as they approach the shaft 198. The shaft 198 carries a member 232 which is provided with projections which are adapted to extend between the spools 207. These projections on the member 232 operate to assist in transferring the eggs from the spools 207 onto a scale device 233 of a grading mechanism. This member 232 also operates to prevent the eggs from falling between the shaft 198 and the scale member 233.

Referring now to Figs. 20 to 27 inclusive, there is disclosed another form of feeding mechanism for advancing the eggs during the candling operation and for transferring the eggs onto a scale device of a grading mechanism. This form of the invention may be substituted for the form of the invention illustrated in Figs. 1A, 2A, 15, 16, 17 and 19. Here the shaft 193, which is driven by the sprocket wheel 192 and chain 191, carries a sprocket wheel 250. A chain 251 extends over this sprocket wheel 250 and over a sprocket wheel 252 carried by a shaft 253 suitably journaled on the frame 11. The chain 251 carries a plurality of brackets 254 provided with a pivot 255 and a pivoted member 256. A pin 257 is secured to each pivoted bracket member 256 and is held in place by nuts 258. A spool 259 is rotatably carried by each pin 257. Secured to the opposite side of the chain 251 and between the brackets 254 are a plurality of members 260.

The upper portion of the chain 251 rides on a member 262 which supports the same and the member 262 carries a cam track 263. As the sprocket wheel 250 is rotated the chain 251 is advanced and carries the spools 259 along therewith. The spools adjacent the sprocket wheel 250 are arranged in a horizontal position, the spools being maintained in this position by a stationary drum. As the spools are advanced from the sprocket wheel 250 toward the other sprocket wheel 252, the spools are tilted upwardly by the cam track 263 as illustrated more clearly in Fig. 22. The eggs are transferred onto the spools 259 from the belts 178 and 179 when the spools are horizontally arranged. As the spools advance the eggs they are rotated by engaging the cam track 263 and they are also tilted upwardly as shown in Fig. 22. The eggs carried thereby are therefore spun and are tilted to a position where their large air cell ends are directed upwardly. When the spools 259 approach the sprocket wheel 252 the cam track 263 lowers the spools 259 and hence the eggs to horizontally arranged positions. The shaft 253 also carries a sprocket wheel 265 which is connected by a chain 266 to a sprocket wheel 267 carried by a shaft 268. The shaft 268 carries a pair of sprocket wheels 269 and 270 which are connected by chains 271 and 272 to sprocket wheels 273 and 274 carried by a shaft 275. The chains 271 and 272 are driven at the same linear speed as the chain 251.

A plurality of boxes 277 are secured to the chains 271 and 272 by brackets 278, the boxes 277 being carried along by the chains 271 and 272. The boxes 277 are provided with removable covers 279 so as to provide access to the interiors thereof. Located in each box 277 is a lamp socket 280 carrying a lamp 281. The lamps 281 are in alignment with lenses 282 carried by the boxes 277. The lenses 282 are located between the spools 259 and operate to direct light onto the eggs carried by the spools. One side of the lamp filament is grounded and the other side is connected through a conductor 283 extending from the socket 280 to a terminal 284 carried by the box. Each of the terminals 284 carries a spring contact member 285 which electrically contact a channel member 286 which is supported by members 287 from the frame 11. The channel member 286 is electrically connected to a suitable source of voltage (not shown). The channel member 286 extends above the chain 271 so that as the boxes in the upper position are advanced, the lamps therein are illuminated. Since the boxes 277 travel along with the eggs, the eggs are continuously illuminated by the lamps in the boxes to provide maximum ease and efficiency in candling the eggs.

The shaft 253 also carries a sprocket wheel 290 which is connected by a chain 291 to a sprocket wheel 292 carried by a shaft 293. The chain 291 carries a plurality of brackets 294 which carry loops 295 for supporting the eggs when they are discharged from the spools 259 as shown more clearly in Fig. 26. As the spools 259 approach the sprocket wheel 252 the loops 295 pass between the spools and the loops 295 operate to lift the eggs from the spools 259. When the loops so lift the eggs from the spools, the loops advance the eggs and discharge the same onto a scale device 296 of a grading mechanism.

The essential difference between the egg advancing and candling mechanism of this form of the invention and that form disclosed above is that the eggs during candling are continuously illuminated. This allows faster operation and more accurate candling by the operator.

The feeding and arranging mechanism of this invention may be used for feeding and arranging articles other than eggs, such as pears, peaches and the like having an uneven weight and volume distribution along their longitudinal axes. While for purposes of illustration two forms of this invention have been disclosed, other forms thereof may become apparent to those skilled in the art upon reference to this disclosure, and therefore this invention is to be limited only by the scope of the appended claims.

We claim as our invention:

1. A feeding and arranging mechanism for eggs and the like comprising a plurality of rollers arranged adjacent each other with their axes parallel, means for advancing the rollers along a path and rotating the same, feeding means for feeding eggs onto the advancing and rotating rollers, said eggs being advanced by the rollers and spun thereby about their long axes substantially parallel to the axes of the rollers and being discharged small end first off of the ends of the rollers toward which the small ends of the eggs are pointing, and conveyor belts on each side of the advancing path of the rollers for receiving and conveying the eggs discharged from the ends of the rollers.

2. A feeding and arranging mechanism for eggs and the like comprising a plurality of rollers arranged adjacent each other with their axes parallel, means for advancing the rollers along a path and rotating the same, feeding means for feeding eggs onto the advancing and rotating rollers, said eggs being advanced by the rollers and spun thereby about their long axes substantially parallel to the axes of the rollers and being discharged small end first off of the ends of the rollers toward which the small ends of the eggs are pointing, and conveyor means on each side of the advancing path of the rollers and movable parallel thereto and in the same direction for receiving and conveying the eggs discharged from the ends of the rollers, said conveyor means receiving and turning the eggs small end forwardly as they are discharged thereon.

3. A feeding and arranging mechanism for eggs and the like comprising a plurality of rollers arranged adjacent each other with their axes parallel, means for advancing the rollers along a path and rotating the same, feeding means for feeding eggs onto the advancing and rotating rollers, said eggs being advanced by the rollers and spun thereby about their long axes substantially parallel to the axes of the rollers and being discharged small end first off of the ends of the rollers toward which the small ends of the eggs are pointing, conveyor means on each side of the advancing path of the rollers and movable parallel thereto and in the same direction for receiving and conveying the eggs discharged from the ends of the rollers, said conveyor means receiving and turning the eggs small end forwardly as they are discharged thereon, a single conveyor beyond the advancing path of the rollers and between said pair of conveyor means, and means for transferring the eggs from the conveyor means onto the single conveyor in single file and small end forwardly to be conveyed thereby.

4. A feeding and arranging mechanism for eggs and the like comprising a plurality of rollers arranged adjacent each other with their axes parallel, means for advancing the rollers along a path and rotating the same, feeding means for feeding eggs onto the advancing and rotating rollers, said eggs being advanced by the rollers and spun thereby about their long axes substantially parallel to the axes of the rollers and being discharged small end first off of the ends of the rollers toward which the small ends of the eggs are pointing, conveyor means on each side of the advancing path of the rollers and movable parallel thereto and in the same direction for receiving and conveying the eggs discharged from the ends of the rollers, said conveyor means receiving and turning the eggs small end forwardly as they are discharged thereon, a single conveyor beyond the advancing path of the rollers and between said pair of conveyor means, means for transferring the eggs from the conveyor means onto the single conveyor in single file and small end forwardly to be conveyed thereby, a plurality of spools arranged adjacent each other with their axes parallel, means for advancing the spools along a path and rotating the same, and means for transferring the eggs from the single conveyor onto the advancing and rotating spools and including means for turning the eggs to cause their long axes to be parallel to the axes of the spools and their small ends extending in the same direction, said eggs being advanced and spun about their long axes by the spools.

5. A feeding and arranging mechanism for eggs and the like comprising a platform moving in one direction and randomly receiving a plurality of eggs, a conveyor located at one end of the moving platform for receiving eggs therefrom and conveying them in single file, a plurality of rollers arranged adjacent each other with their axes parallel, means for rotating the rollers and advancing the same along a path transversely to the path of the conveyor, feeding means for feeding eggs one at a time from the conveyor onto the advancing and rotating rollers, said eggs being advanced by the rollers and spun thereby about their long axes substantially parallel to the axes of the rollers and being discharged small end first off of the ends of the rollers toward which the small ends of the eggs are pointing, and conveyor belts on each side of the advancing path of the rollers for receiving and conveying the eggs discharged from the ends of the rollers.

6. A feeding and arranging mechanism for eggs and the like comprising a platform moving in one direction and randomly receiving a plurality of eggs, a conveyor located at one end of the moving platform for receiving eggs therefrom and conveying them in single file, a plurality of rollers arranged adjacent each other with their axes parallel, means for rotating the rollers and advancing the same along a path transversely to the path of the conveyor, feeding means for feeding eggs from the conveyor onto the adavncing and rotating rollers, said eggs being advanced by the rollers and spun thereby about their long axes substantially parallel to the axes of the rollers and being discharged small end first off of the ends of the rollers toward which the small ends of the eggs are pointing, and conveyor means on each side of the advancing path of the rollers and movable parallel thereto and in the same direction for receiving and conveying the eggs discharged from the ends of the rollers, said conveyor means receiving and turning the eggs small end forwardly as they are discharged thereon.

7. A feeding and arranging mechanism for eggs and the like comprising a platform moving in one direction and randomly receiving a plurality of eggs, a conveyor located at one end of the moving platform for receiving eggs therefrom and conveying them in single file, a plurality of rollers arranged adjacent each other with their axes parallel, means for rotating the rollers and advancing the same along a path transversely to the path of the conveyor, feeding means for feeding eggs from the conveyor onto the advancing and rotating rollers, said eggs being advanced by the rollers and spun thereby about their long axes substantially parallel to the axes of the rollers and being discharged small end first off of the ends of the rollers toward which the small ends of the eggs are pointing, conveyor means on each side of the advancing path of the rollers and movable parallel thereto and in the same direction for receiving and conveying the eggs discharged from the ends of the rollers, said conveyor means receiving and turning the eggs small end forwardly as they are discharged thereon, a single conveyor beyond the advancing path of the rollers and between said pair of conveyor means, and means for transferring the eggs from the conveyor means onto the single conveyor in single file and small end forwardly to be conveyed thereby.

8. A feeding and arranging mechanism for eggs and the like comprising a platform moving in one direction and randomly receiving a plurality of eggs, a conveyor located at one end of the moving platform for receiving eggs therefrom and conveying them in single file, a plurality of rollers arranged adjacent each other with their axes parallel, means for rotating the rollers and advancing the same along a path transversely to the path of the conveyor, feeding means for feeding eggs from the conveyor onto the advancing and rotating rollers, said eggs being advanced by the rollers and spun thereby about their long axes substantially parallel to the axes of the rollers and being discharged small end first off of the rollers toward which the small ends of the eggs are pointing, conveyor means on each side of the advancing path of the rollers and movable parallel thereto and in the same direction for receiving and conveying the eggs discharged from the ends of the rollers, said conveyor means receiving and turning the eggs small end forwardly as they are discharged thereon, a single conveyor beyond the advancing path of the rollers and between said pair of conveyor means, and means for transferring the eggs from the conveyor means onto the single conveyor in single file and small end forwardly to be conveyed thereby, a plurality of spools arranged adjacent each other with their axes parallel, means for advancing the spools along a path and rotating the same, means for transferring the eggs from the single conveyor onto the advancing and rotating spools and including means for turning the eggs to cause their long axes to be parallel to the axes of the spools and their small ends extending in the same direction, said eggs being advanced and spun about their long axes by the spools.

9. A feeding and arranging mechanism for eggs and the like comprising a platform moving in one direction and randomly receiving a plurality of eggs, a conveyor located at one end of the moving platform for receiving eggs therefrom and conveying them in single file, a plurality of rollers arranged adjacent each other with their axes parallel, means for rotating the rollers and advancing the same along a path transversely to the path of the conveyor, feeding means for feeding eggs from the conveyor onto the advancing and rotating rollers, and including a plurality of fingers for engaging the eggs on the conveyor and moving them one at a time onto the rollers, said eggs being advanced by the rollers and spun thereby about their long axes substantially parallel to the axes of the rollers and being discharged small end first off of the ends of the rollers toward which the small ends of the eggs are pointing, and conveyor means on each side of the advancing path of the rollers for receiving and conveying the eggs discharged from the ends of the rollers.

10. A feeding and arranging mechanism for eggs and the like comprising a conveyor for conveying eggs in single file, a plurality of rollers arranged adjacent each other with their axes parallel, means for rotating the rollers and advancing the same along a path transversely to the path of the conveyor, feeding means, including a plurality of fingers for engaging the eggs on the conveyor and moving them one at a time onto the rollers, said eggs being advanced by the rollers and spun thereby about their long axes substantially parallel to the axes of the rollers and being discharged small end first off of the ends of the rollers toward which the small ends of the eggs are pointing, and conveyor means on each side of the advancing path of the rollers for receiving and conveying the eggs discharged from the ends of the rollers.

11. A feeding and arranging mechanism for eggs and the like comprising a plurality of rollers arranged adjacent each other with their axes parallel, means for advancing the rollers along a path and rotating the same, feeding means for feeding eggs onto the advancing and rotating rollers, said eggs being advanced by the rollers and spun thereby about their long axes substantially parallel to the axes of the rollers and being discharged small end first off of the ends of the rollers toward which the small ends of the eggs are pointing, and conveyor means on each side of the advancing path of the rollers and movable parallel thereto and in the same direction for receiving and conveying the eggs discharged from the ends of the rollers, each conveyor means including a pair of spaced parallel belts receiving and turning the eggs small end forwardly as they are discharged thereon.

12. A feeding and arranging mechanism for eggs and the like comprising a plurality of rollers arranged adjacent each other with their axes parallel, means for advancing the rollers along a path and rotating the same, feeding means for feeding eggs onto the advancing and rotating rollers, said eggs being advanced by the rollers and spun thereby about their long axes substantially parallel to the axes of the rollers and being discharged small end first off of the ends of the rollers toward which the small ends of the eggs are pointing, conveyor means on each side of the advancing path of the rollers and movable parallel thereto and in the same direction for receiving and conveying the eggs discharged from the ends of the rollers, each conveyor means including a pair of spaced parallel belts receiving and turning the eggs point forwardly as they are discharged thereon, a conveyor including a pair of belts beyond the advancing path of the rollers, a plurality of belts arranged between the belts of the conveyor means and the belts of the conveyor for transferring the eggs from the conveyor means to the conveyor, and guide means for guiding the eggs along the plurality of belts.

13. In a feeding and arranging mechanism for eggs and the like, a plurality of rollers arranged adjacent each other with their axes parallel, a pair of driven chains rotatably carrying the rollers for advancing the same along a path, a stationary platform engaged by the rollers for supporting and rotating the rollers as they are advanced, feeding means for feeding eggs on to the advancing and rotating rollers, said eggs being advanced by the rollers and spun thereby about their long axes substantially parallel to the axes of the rollers and being discharged small end first off of the ends of the rollers toward which the small ends of the eggs are pointing, and conveyor belts on each side of the advancing path of the rollers for receiving and conveying the eggs discharged from the ends of the rollers.

14. In a feeding and arranging mechanism for eggs, a conveyor including a plurality of spools arranged adjacent each other with their axes parallel, a driven chain carrying the spools for advancing the same along a path, the spools carrying eggs thereon, a shaft, a sprocket wheel carried by the shaft and carrying the chain at the discharge end of the conveyor, a second shaft beyond the discharge end of the conveyor, a sprocket wheel carried by each shaft, a chain carried by the last mentioned sprocket wheels, and a plurality of loops carried by the last mentioned chain, said loops consecutively passing between the spools of the conveyor for lifting the eggs from the spools and conveying them from the discharge end of the conveyor.

15. A feeding and arranging mechanism for eggs and the like comprising a plurality of rollers arranged adjacent each other with their axes parallel, means for advancing the rollers along a path normal to the axes of the rollers and rotating the rollers about their axes, feeding means for feeding eggs onto the advancing and rotating rollers, said rollers advancing the eggs along the advancing path of the rollers, arranging and spinning the eggs about their long axes substantially parallel to the axes of the rollers, and moving the eggs longitudinally along the rollers in the directions of their pointed ends towards the ends of the rollers to separate the eggs into two groups in accordance with the orientations of their pointed ends, and conveyor means for separately receiving and conveying the two groups of eggs from the advancing and rotating rollers.

16. A feeding and arranging mechanism for eggs and the like comprising a plurality of rollers arranged adjacent each other with their axes parallel, means for advancing the rollers along a path normal to the axes of the rollers and rotating the rollers about their axes, feeding means for feeding eggs onto the advancing and rotating rollers, said rollers advancing the eggs along the advancing path of the rollers, arranging and spinning the eggs about their long axes substantially parallel to the axes of the roller, and moving the eggs longitudinally along the rollers in the directions of their pointed ends towards the ends of the rollers to separate the eggs into two groups in accordance with the orientations of their pointed ends, conveyor means for separately receiving and conveying the two groups of eggs from the advancing and rotating rollers and including means for turning the eggs small end forwardly, a single conveyor, and means for transferring the eggs from the conveyor means onto the single conveyor in single file and small end forwardly to be conveyed thereby.

17. A feeding and arranging mechanism for eggs and the like comprising a plurality of rollers arranged adjacent each other with their axes parallel, means for advancing the rollers along a path normal to the axes of the rollers and rotating the rollers about their axes, feeding means for feeding eggs onto the advancing and rotating rollers, said rollers advancing the eggs along the advancing path of the rollers, arranging and spinning the eggs about their long axes substantially parallel to the axes of the rollers, and moving the eggs longitudinally along the rollers in the directions of their pointed ends towards the ends of the rollers to separate the eggs into two groups in accordance with the orientations of their pointed ends, a plurality of spools arranged adjacent each other with their axes parallel, means for advancing the spools along a path normal to the axes of the spools and rotating the spools about their axes, and means for separately receiving the two groups of eggs from the advancing and rotating rollers and transferring them onto the advancing and rotating spools with the long axes of the eggs parallel to the axes of the spools and with their small ends extending in the same direction, said spools advancing the eggs and spinning them about their long axes.

18. A feeding and arranging mechanism for eggs and the like comprising a platform randomly receiving a plurality of eggs, a plurality of rollers arranged adjacent each other with their axes parallel, means for advancing the rollers along a path normal to the axes of the rollers and rotating the rollers about their axes, feeding means for feeding eggs one at a time from the platform onto the advancing and rotating rollers, said rollers advancing the eggs along the advancing path of the rollers, arranging and spinning the eggs about their long axes substantially parallel to the axes of the rollers, and moving the eggs longitudinally along the rollers in the directions of their pointed ends towards the ends of the rollers to separate the eggs into two groups in accordance with the orientations of their pointed ends, and conveyor means for separately receiving and conveying the two groups of eggs from the advancing and rotating rollers.

19. A feeding and arranging mechanism for eggs and the like comprising a platform moving in one direction and randomly receiving a plurality of eggs, a conveyor located at one end of the moving platform for receiving eggs therefrom and conveying them in single file, a plurality of rollers arranged adjacent each other with their axes parallel, means for advancing the rollers along a path normal to the axes of the rollers and rotating the rollers about their axes, means for transferring eggs one at a time from the conveyor onto the advancing and rotating rollers, said rollers advancing the eggs along the advancing path of the rollers, arranging and spinning the eggs about their long axes substantially parallel to the axes of the rollers, and moving the eggs longitudinally along the rollers in the directions of their pointed ends towards the ends of the rollers to separate the eggs into two groups in accordance with the orientations of their pointed ends, and conveyor means for separately receiving and conveying the two groups of eggs from the advancing and rotating rollers.

20. A feeding and arranging mechanism for eggs and the like comprising a platform moving in one direction and randomly receiving a plurality of eggs, a conveyor located at one end of the moving platform for receiving eggs therefrom and conveying them in single file, a plurality of rollers arranged adjacent each other with their axes parallel, means for advancing the rollers along a path normal to the axes of the rollers and rotating the rollers about their axes, means for feeding eggs from the conveyor onto the advancing and rotating rollers and including a plurality of fingers for engaging the eggs on the conveyor and moving them one at a time onto the rollers, said rollers advancing the eggs along the advancing path of the rollers, arranging and spinning the eggs about their long axes substantially parallel to the axes of the rollers, and moving the eggs longitudinally along the rollers in the directions of their pointed ends towards the ends of the rollers to separate the eggs into two groups in accordance with the orientations of their pointed ends.

21. A feeding and arranging mechanism for eggs and the like comprising a plurality of rollers arranged adjacent each other with their axes parallel, a pair of driven chains rotatably carrying the rollers for advancing the same along a path normal to the axes of the rollers, a stationary platform engaged by the rollers for supporting and rotating the rollers as they are advanced by the chains, feeding means for feeding eggs onto the advancing and rotating rollers, said rollers advancing the eggs along the advancing path of the rollers, arranging and spinning the eggs about their long axes substantially parallel to the axes of the rollers, and moving the eggs longitudinally along the rollers in the directions of their pointed ends towards the ends of the rollers to separate the eggs into two groups in accordance with the orientations of their pointed ends, and conveyor means for separately receiving and conveying the two groups of eggs from the advancing and rotating rollers.

References Cited in the file of this patent

UNITED STATES PATENTS

| | | | |
|---|---|---|---|
| 1,728,462 | Wyland | | Sept. 17, 1929 |
| 1,864,034 | Wyland | | June 21, 1932 |
| 1,954,164 | Wyland | | Apr. 10, 1934 |
| 2,135,778 | Wyland | | Nov. 8, 1938 |
| 2,166,706 | Schwarzkopf | | July 18, 1939 |
| 2,246,597 | Niederer | | June 24, 1941 |
| 2,451,577 | Roberts | | Oct. 19, 1948 |
| 2,488,230 | Page | | Nov. 15, 1949 |
| 2,520,610 | Powell | | Aug. 29, 1950 |
| 2,684,748 | Sneed | | July 27, 1954 |
| 2,704,146 | Reck | | Mar. 15, 1955 |
| 2,711,813 | Jordan | | June 28, 1955 |

FOREIGN PATENTS

| | | |
|---|---|---|
| 434,861 | Great Britain | Sept. 10, 1935 |